J. W. BANKS.
EQUALIZING DEVICE FOR OIL PRESS CAKES.
APPLICATION FILED APR. 28, 1915.
1,169,112.
Patented Jan. 25, 1916.
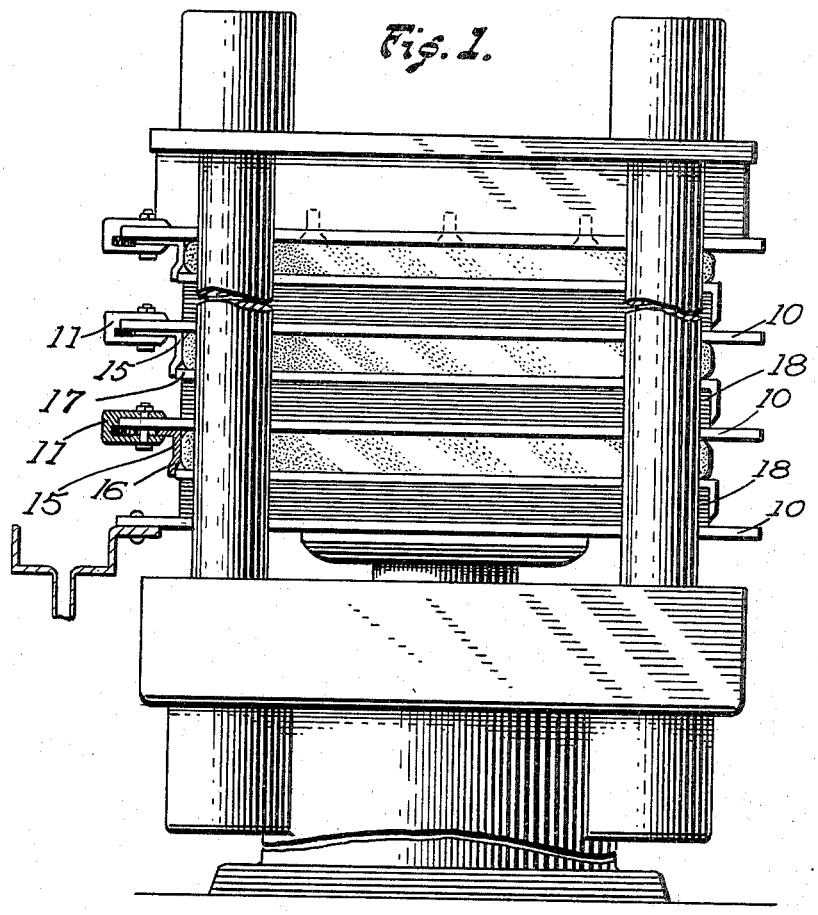
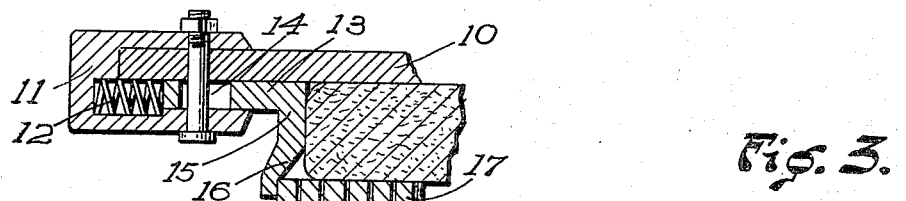
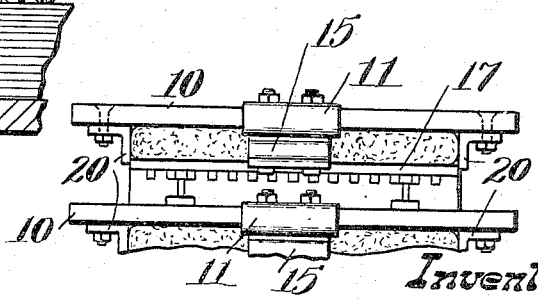
Witnesses:
H. M. Rugg
C. F. Wesson
Inventor:
John W. Banks
By Attorneys
Southgate & Southgate

UNITED STATES PATENT OFFICE.

JOHN W. BANKS, OF TORREÓN, MEXICO.

EQUALIZING DEVICE FOR OIL-PRESS CAKES.

1,169,112.  Specification of Letters Patent.  Patented Jan. 25, 1916.

Application filed April 28, 1915. Serial No. 24,581.

*To all whom it may concern:*

Be it known that I, JOHN W. BANKS, a citizen of the United States, residing at Torreón, in the county of Viesca and State of Coahuila, Mexico, have invented a new and useful Equalizing Device for Oil-Press Cakes, of which the following is a specification.

This invention relates to a device for use on oil presses.

The principal objects of the invention are to provide means whereby the placing of the press cakes too far back in the press will be avoided and the cakes will be located in vertical alinement so that they will be pressed evenly.

The invention also involves improvements in details of construction of the device.

Reference is to be had to the accompanying drawings in which—

Figure 1 is a side elevation of an oil press with a preferred embodiment of this invention applied thereto, one of the equalizers being shown in section; Fig. 2 is an enlarged sectional view of one of the press boxes and equalizers, and Fig. 3 is a perspective view of the end of the same.

Ordinarily oil presses are so constructed that it is a matter of some skill and judgment for the operator to place the press cakes in position. As a matter of fact not much attention is given to this and some cakes are shoved in too far and others not far enough, the ordinary practice being simply to get them to average up about right. This results in some of the cakes projecting too far, especially on the rear. The projecting portion of the oil cake then fails to receive proper pressure and the oil is not extracted from it. Furthermore as the projecting part of the cake is under less pressure than the remainder of the cake it tends to absorb oil from that part of the cake which is properly pressed, especially just at the time when the pressure is released. Sometimes also the projecting end of the bag bursts causing loss of material and time. These difficulties have been known for a long time and many devices have been invented for the purpose of holding the cake. This invention is designed for the same purpose, but instead of providing means for preventing the escape of the oil and seed or other press cake material, I provide an equalizing device which will necessitate the oil cake being placed in proper position on the press. For this purpose each press plate 10 except the bottom one is provided with an equalizer constructed in accordance with this invention and located at the rear thereof. This equalizer consists of a U-shaped piece 11 the top of which is adapted to rest on the top of the plate and the bottom of which is spaced from its lower surface. This is held on the plate by two bolts which extend through the U-piece and through perforations in the plate 10. In the bottom of the U-piece is a socket for two springs 12. These springs bears on a plunger 13 which has two elongated perforations 14 to permit it to slide on and be guided by the bolts. The plunger is also provided with a flange 15 and a beveled end 16 at the bottom. This beveled end is intended to be located in a normal condition just at the end of the mat 17 on which the oil cake is to rest.

It will be understood of course also that the press box is made up in the usual way with a plate 10 at top and bottom, grate 18, mat 17 and two angle bars 20 and that these parts are assembled in the ordinary manner, although the invention is capable of being applied to presses of other than the ordinary types. The angle bars as well as the flange 15 telescope with respect to the other parts when pressure is applied.

In the operation of the press these equalizers are placed at the rear of the several plates 10 and when an oil cake is moved in on the top of the mat it is moved in until the pressure of the spring is felt. In all cases therefore it engages the flange 15 and compresses the springs slightly. No special care need be taken in the insertion of the oil cake because if it comes up with a bang against the flange the springs will compress and take care of it. Furthermore, when the operator releases the cake the springs will expand again and force the cake back to a position in which the beveled end 16 again engages the mat which, with the bolts, limits the motion of the flange forwardly. Therefore, in all cases even with the most careless handling the cakes line up together and there is no projecting end at the rear that can fail to receive the proper amount of pressure or absorb any oil from the rest of the cake. In this way the efficiency of the press is increased by a very appreciable percentage, and yet unskilled and careless labor can be employed.

It will be understood of course that ordinarily the cakes get moved in far enough because the operator can see the front end so that there is very little trouble at the front end of the press.

Although I have illustrated and described only a single embodiment of the invention and a single type of oil press, I am aware of the fact that many modifications can be made in the construction and arrangement of parts and that it can be applied to other types of presses without departing from the scope of the invention as expressed in the claims. Therefore, I do not wish to be limited to all the details of construction herein shown and described or to the particular type of press illustrated, but What I do claim is:—

1. The combination of an oil press having a plurality of plates forming the bottoms and tops of the boxes, of equalizing devices located at the rear ends of the plates for engaging the oil cakes when moved in and preventing their being moved in too far.

2. In an oil press, the combination with the plates for forming the tops and bottoms of the boxes, of yielding means located at the rear of the plates for limiting the rearmost positions of the oil cakes.

3. As an article of manufacture, an equalizer for an oil press comprising a member adapted to be secured to the end of a press box plate and having a yielding plunger therein for receiving the end of a press cake.

4. As an article of manufacture, a U-shaped member having a top and a bottom flange, the top flange being adapted to rest on the top of a press box plate, and the bottom flange being spaced from the bottom of the plate, means for securing said U-shaped member in fixed position to the plate, springs carried by said U-shaped member under the plate and a plunger movable between the bottom of said plate and member and engaging said springs, said plunger having a vertical flange for receiving the end of the press cake, and a beveled end for engaging the end of the mat and limiting the position of the plunger.

5. As an article of manufacture, a U-shaped member having a top and a bottom flange, the top flange being adapted to rest on the top of a press box plate, and the bottom flange being spaced from the bottom of the plate, means for securing said U-shaped member in fixed position to the plate, springs carried by said U-shaped member under the plate and a plunger movable between the bottom of said plate and member and engaging said springs.

In testimony whereof I have hereunto set my hand.

JOHN W. BANKS.

Copies of this patent may be obtained for five cents each, by addressing the "Commissioner of Patents, Washington, D. C."